INVENTORS
CARL W. ZIMMERMAN
GEORGE V. COPLAND

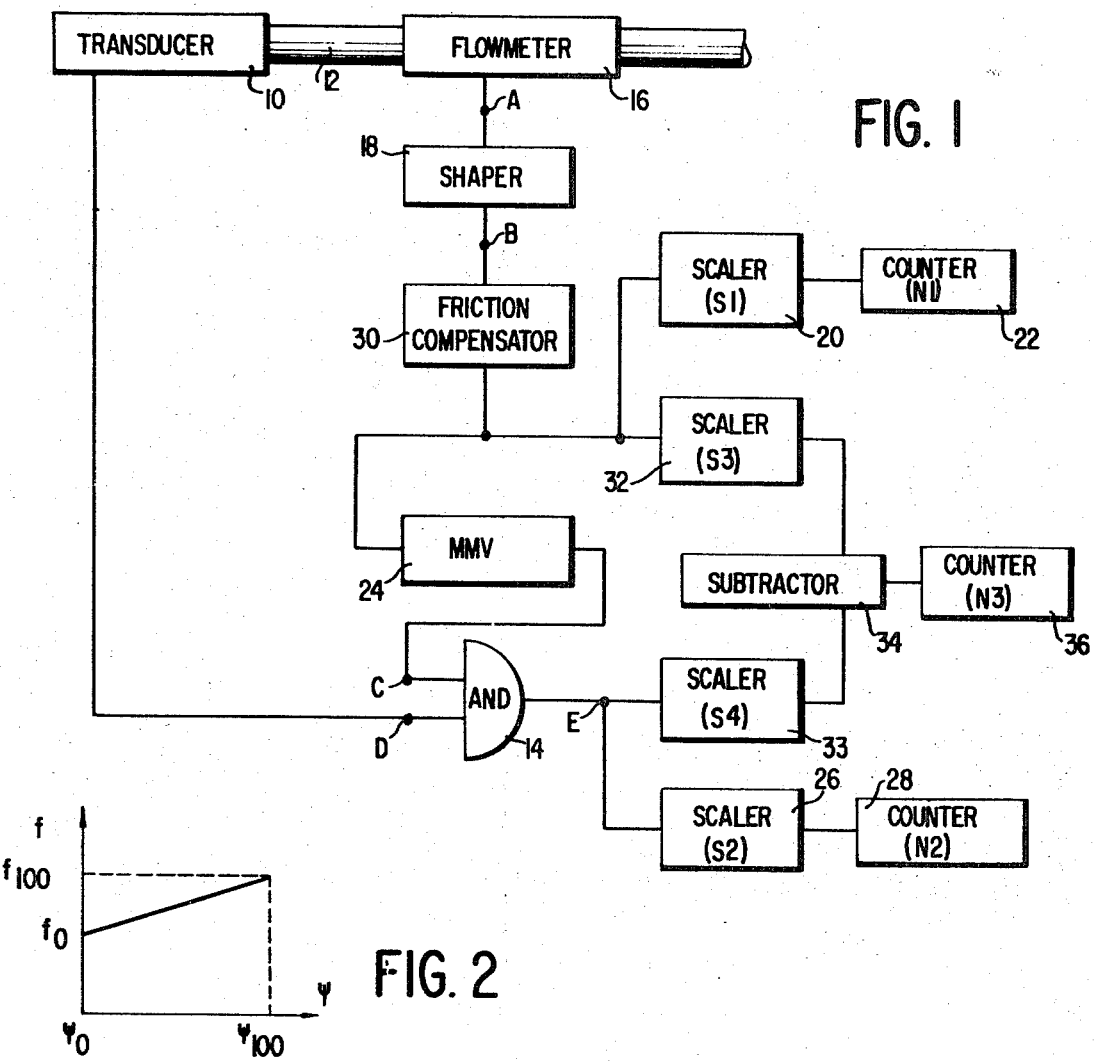
FIG. 1
FIG. 2
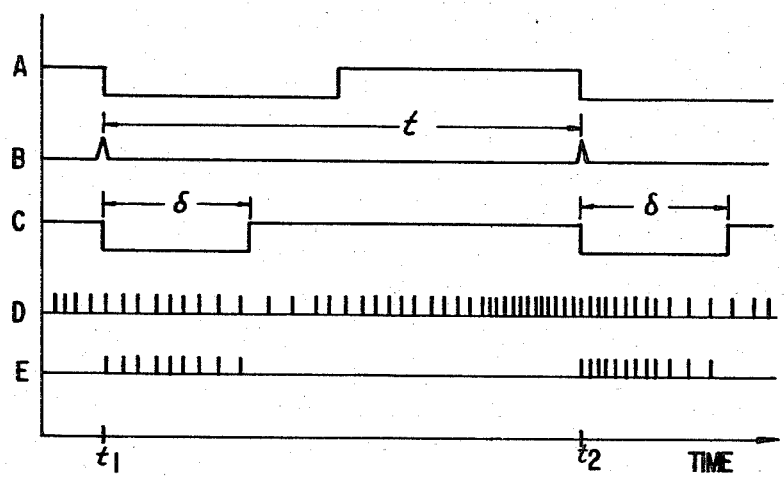
FIG. 3
INVENTORS
CARL W. ZIMMERMAN
GEORGE V. COPLAND
by: Burns, Doane, Swecker & Mathis
ATTORNEYS Sept. 20, 1971   C. W. ZIMMERMAN ET AL   3,605,497
FLOWMETER BEARING FRICTION COMPENSATING METHOD AND SYSTEM
Original Filed July 5, 1968   2 Sheets-Sheet 2

BY Burns, Doane,
Swecker & Mathis
ATTORNEYS

United States Patent Office 3,605,497
Patented Sept. 20, 1971

3,605,497
FLOWMETER BEARING FRICTION COMPENSATING METHOD AND SYSTEM
Carl W. Zimmerman and George V. Copland, Duncan, Okla., assignors to Halliburton Company, Duncan, Okla.
Application July 5, 1968, Ser. No. 750,675, now Patent No. 3,566,685, dated Mar. 2, 1971, which is a continuation-in-part of application Ser. No. 704,703, Feb. 9, 1968. Divided and this application Aug. 4, 1970, Ser. No. 60,851
Int. Cl. G01f 1/12
U.S. Cl. 73—229                    5 Claims

ABSTRACT OF THE DISCLOSURE

A flowmeter bearing friction compensating method and circuit for use in a fluid flow metering system using digital signals and logic for producing a compensated manifestation of fluid flow. Means are provided to prevent the generation of compensating pulses in the absence of fluid flow.

RELATED APPLICATIONS

This is a division of application Ser. No. 750,675, filed July 5, 1968, now Pat. No. 3,566,685 issued March 2, 1971, said application Ser. No. 750,675 being a continuation-in-part of application Ser. No. 704,703, filed Feb. 9, 1968 and now abandoned.

BACKGROUND OF THE INVENTION

The problem of compensating fluid flowmeters for variable physical conditions of the fluid, such as composition, density, pressure, temperature and the like, has long been recognized and numerous methods and techniques have been used for various applications. Among these methods have been mechanical, electro-mechanical and electrical systems for integrating the output of a flowmeter and the output of a condition responsive transducer to yield a flowmeter reading compensated for a condition of the fluid.

The use of a totally electrical system results not only in the miniaturization of the apparatus but also in a reduced number of moving parts and problems of maintenance and repair. Totally electric systems offer greatly expanded flexibility in design as well. In a totally electrical system it is desirable to accomplish the compensation through the utilization of digital electronic equipment, i.e., digital output signals from both the fluid flowmeter and the condition responsive transducer. This makes possible the utilization of pulse responsive circuitry throughout and eliminates the critical voltage level adjustments commonly required in analog systems. Systems of this type are disclosed and claimed in the copending U.S. applications Ser. Nos. 750,675 (now Letters Patent No. 3,566,685) and 20,645 for "Fluid Flow Metering Method and System" filed respectively on July 5, 1968, and March 18, 1970 and assigned to the assignee of the present inventions.

In the above referenced applications, the disclosure of which is hereby incorporated by reference, the digital output signal of the flowmeter is used to gate a higher frequency signal to produce packets of pulses which are applied to an appropriate counting device. Where the system is used in conjunction with producing oil wells, a transducer may monitor one or more conditions of the fluid such as pressure, temperature, density and oil/water ratio. The transducer output signal is either initially generated as a pulse signal or is converted to that form before being combined in a mathematical relationship in incremental units of flow. The combined incremental units, a mathematical multiplication product of fluid flow rate and the condition for which compensation is to be made, are summed over a relatively larger quantity of flow in pulse counters or accumulator registers. The data in the accumulator registers may thereafter be processed in a digital computer or be translated by logic circuits to produce directly readable manifestations of the compensated fluid flow.

A primary object of the present invention is to remedy the deficiencies of the prior art systems which have failed to provide compensation for bearing friction within the flowmeter which inhibits the rotation of the flowmeter rotor and thus the generation of flow responsive pulses. This failure to compensate for bearing friction of the flowmeter assumes increased significance when, as in the referenced systems, each flow responsive pulse enables a gate to pass a large number of pulses into an accumulator register. Caution must be exercised in compensating the system for bearing friction by adding pulses, for each compensating pulse added at very low flow rates will result in the accumulation of a large number of pulses in the accumulator register.

Accordingly, the present invention provides for the addition of pulse packet gating, flow responsive pulses at flow rates which exceed a predetermined minimum.

These and other objects and advantages will be apparent from the claims and from the following detailed description when read in conjunction with the appended drawings.

THE DRAWINGS

FIG. 1 is a functional block diagram illustrating the basic system of the present invention.

FIG. 2 is a graph illustrating the relationship between the output signal frequency and a variable condition of the flow stream as detected by the transducer.

FIG. 3 is a timing diagram showing voltage waveforms at various points identified on the block diagram of FIG. 1.

THE BASIC SYSTEM

Figure 4:
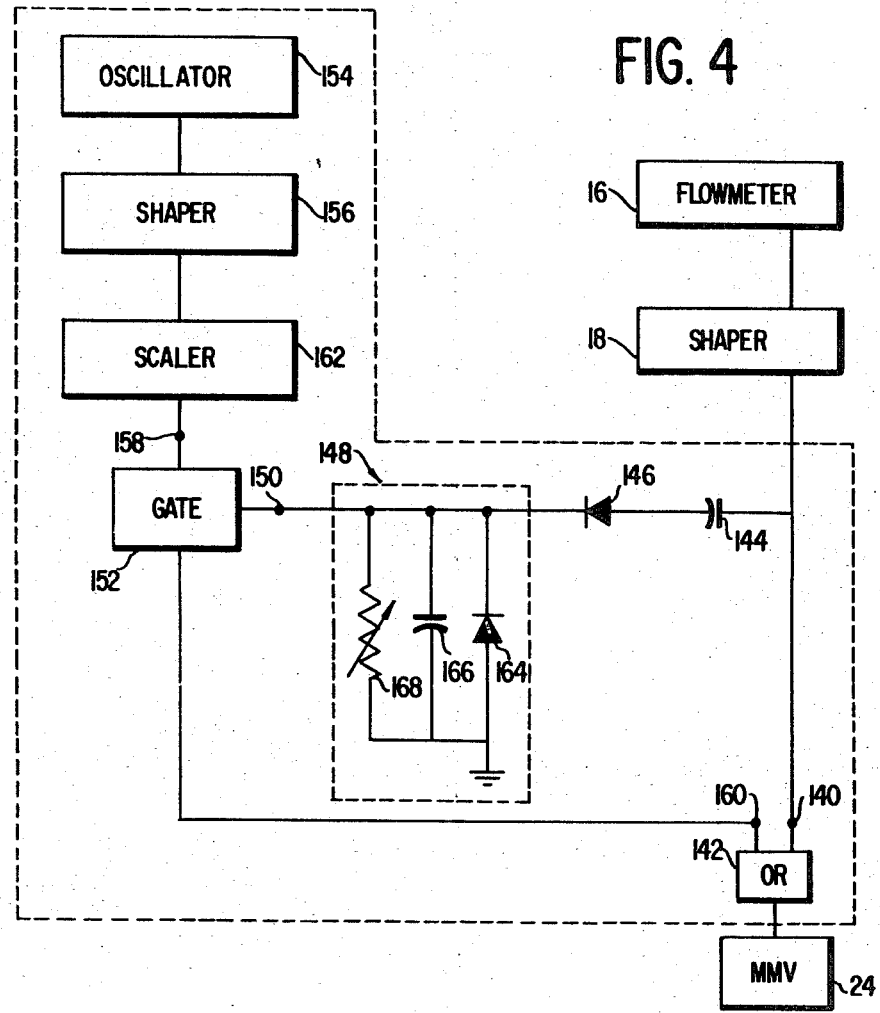
FIG. 4 is a functional block diagram of the bearing friction compensation circuit adapted for use in the system of FIG. 1.

Referring now to FIG. 1, a transducer 10 is disposed in a conduit 12 used to transport a fluid mixture of oil in water which may, for example, be located at a well testing station. Transducer 10 may be a capacitance probe oscillator conventionally used in a net oil analyzer and comprise a Clapp oscillator circuit having a variable capacitor in the electrical tank circuit which determines the frequency of the oscillator circuit. The variable capacitor is physically located in the conduit 12. The frequency of the oscillator varies as a function of the value of the capacitance of the probe in conduit 12 and is thus responsive to changes in the dielectric constant of the material between the plates of the probe. As the dielectric constant for oil (about 2.5) is significantly less than that of water (80) and as a mixture of oil and water is present between the plates of the capacitance probe, the output frequency of the oscillator is related to the fractional volume of the flow stream which is oil, generally as illustrated in FIG. 2. In the system described, this frequency will be used as a measure of the percentage of oil in the conduit 12.

The electrical output signal from the oscillator, which is here regarded as being part of transducer 10, is fed to one input terminal AND gate 14 after shaping in conventional pulse shaping circuitry (not shown). These pulses are selectively gated, as will be described below, in accord with the fluid flow rate and are counted in counter 28.

Also disposed in conduit 12 is a flowmeter 16 which may be of any suitable type, such as the turbine mass flowmeter disclosed in U.S. Pat. 3,164,020 to Edward Groner et al. Alternatively, a suitable positive displacement meter may be employed.

An alternating voltage output signal from the flowmeter 16 is fed to a shaper 18 and from shaper 18 through the friction compensator circuit 30 to scaler 20 and counter 22. The counter 22 provides a manifestation related to total flow. Both scaler 20 and counter 22 are conventional in operation. Scaler 20 may be any conventional circuit in which a predetermined number of pulses must be applied to the input terminal to generate a single pulse at the output thereof.

Counter 22 may be likewise of any conventional electrical or electro-mechanical type and may, but need not, provide a visual indication of the count. A suitable counter, for example, is the Hecon series FR967 counter commercially obtainable from Hengstler Numerics, Inc., of Palisades Park, N.J.

The circuitry of shaper 18 is conventional and is designed to provide a steep wavefront triggering pulse suitable for operating scaler 20 and monostable or one-shot multivibrator 24. Multivibrator 24 produces an output pulse of fixed duration to enable AND gate 14 for the duration of the output pulse each time the multivibrator 24 is triggered.

It is necessary that the duration of the multivibrator 24 output pulse be less than the minimum time between adjacent pulses from flowmeter 16 at maximum flow rate and that it be sufficiently long to allow the passage of several pulses from transducer 10. A typical maximum output frequency from the flowmeter may be 800 c.p.s. which means spacing between adjacent pulses will be at least 1250 $\mu$s. The duration of the output pulse from multivibrator 24 may be therefore selected to be about 1000 $\mu$s.

The waveforms illustrated in FIG. 3 are those appearing at correspondingly labeled terminals in FIG. 1. The output signal from flowmeter 16 is generated directly or shaped to have the substantially square wave of waveform A, the frequency being related to fluid flow. An incremental integration period $t_1$ to $t_2$ is determined in the embodiment illustrated by successive negative going or trailing edges of each positive pulse of waveform A. The output pulse from shaper 18 at terminal B of FIG. 1 is illustrated as waveform B and is used to trigger monostable multivibrator 24 to produce the enabling signals for AND gate 14. The enabling signals have a duration $\delta$ and are illustrated in waveform C of FIG. 3.

The output of transducer 10 is illustrated in waveform D and is applied to terminal D of AND gate 14 in FIG. 1. The presence of an enabling pulse (waveform C) on terminal C of AND gate 14 allows the pulses in waveform D applied to terminal D to be passed by AND gate 14 to the output terminal E as illustrated in waveform E.

The input signal from transducer 10 which is applied to terminal D of AND gate 14 in FIG. 1 is thus a train of pulses having a frequency or recurrence rate related to the oil fraction of the liquid flowing in conduit 12. The output of the flowmeter 16 is likewise a train of pulses having a frequency or recurrence rate related to the rate of fluid flow through conduit 12. The relative frequency or recurrence rate of the transducer 10 output pulses is desirably maintained quite high with respect to the output of the flowmeter 16 either by the design of the transducer 10 and flowmeter 16 or by the scaling of the flowmeter pulses applied to multivibrator 24. It is desirable, for reasons of accuracy, to have several scores or hundreds of pulses appear at the output of AND gate 14 in each gated period. Each pulse from flowmeter 16 will thus trigger multivibrator 24 which will in turn enable AND gate 14 for a period of time as determined by the time constant of the multivibrator 24; AND gate 14 then passes a large number of pulses to counter 28, the exact number of pulses passed being related to the oil fraction detected by transducer 10 during the period AND gate 14 is enabled by a pulse from multivibrator 24.

The average percent oil factor $\psi$ can be shown to be $$\psi = \frac{100}{\delta f_{100} - \delta f_0} \left( \frac{S_2 N_2}{S_1 N_1} - \delta f_0 \right) \quad (1)$$

where:

$f_{100}$ is the transducer frequency at 100% oil,
$f_0$ is the transducer frequency at 0% oil (water only),
$S_1$ is the scaling factor of scaler 20,
$S_2$ is the scaling factor of scaler 26,
$N_1$ is the count registered in counter 22, and
$N_2$ is the count registered in counter 28.

A second embodiment of the present invention employs scalers 32 and 33, subtractor 34 and a counter 36. In this embodiment, the calculations necessary to provide a manifestation compensated to correct for the constituency of the liquid are performed through logic and a directly readable compensated manifestation of the net oil flow is obtained. With continued reference to FIG. 1, the output of shaper 18 is shown connected through a friction compensator 30 to multivibrator 24 which supplies the enabling pulses to terminal C of AND gate 14. Packets of high frequency pulses applied to terminal D from transducer 10 are passed through gate 14 to scaler 33. The output of scaler 32, which receives the flow representative pulses, and the output of scaler 33 are connected to a subtractor 34 to provide an output signal corresponding to the difference between its input signals. The output of subtractor 34 is totalized in counter 36.

The values for the scaling factors $S_3$ and $S_4$ of scalers 32 and 33, respectively, may be calculated as follows:

$$S_3 = S_1 \frac{\delta f_{100} - \delta f_0}{\delta f_0} \quad (2)$$

$$S_4 = S_3 \delta f_0 \quad (3)$$

With continued reference to FIG. 1, a flowmeter bearing friction compensator 30 may be connected between shaper 18 and multivibrator 24. This circuit is provided to compensate for bearing friction in flowmeter 16 which retards rotation of the flowmeter at all rates of fluid flow through conduit 12. In practice, bearing friction losses are not normally significant except in connection with the measurement of gas flow.

Compensation is achieved by adding pulses to the input of multibrator 24 from a source separate from the flowmeter. These compensating pulses cannot, however, be continuously added since pulses from transducer 10 are continuously present on terminal D of AND gate 14 irrespective of whether or not there is actual flow of fluid in conduit 12. An error would be introduced in the pulse counts accumulated in the counter 36 if bearing friction compensating pulses were allowed to enter the system as by triggering multivibrator 24 when the flow rate is zero. Accordingly, provision is made to inhibit the addition of the friction compensating pulses for flow rates below a predetermined value.

With reference to FIG. 4, the operation of friction compensator 30 will now be described. Basically, the shaped output pulse from flowmeter 16 is applied to terminal 140 of OR gate 142 and through coupling capacitor 144 and diode 146 to the diode pump circuit 148. The output of circuit 148 is connected to input terminal 150 of gate 152 as an enabling signal.

The output of a fixed frequency oscillator 154 is shaped in shaper 156 and applied to terminal 158 of gate 152. The output signal of the gate 152 which comprises pulses similar to those from flowmeter 16 is applied to the other input terminal 160 of OR gate 142. The output of the OR gate 142 is fed to the multivibrator 24. A scaler 162 may be added as necessary to reduce the effective operating frequency of the oscillator 154.

In operation, the diode pump circuit 148 operates to provide an enabling signal to gate 152 only when the shaft of flowmeter 16 is rotating i.e., when pulses are being generated. This means that the fixed frequency output pulses of oscillator 154, which may optionally be reduced by means of scaler 162, are added to the pulses applied to the input of multivibrator 24 by OR gate 142 only when the fluid flow through conduit 12 is sufficient to overcome the bearing friction of the flowmeter 16.

The diode pump circuit 148 comprises diode 164, capacitor 166 and resistor 168 connected in parallel to ground. The pulses from shaper 18 are coupled through capacitor 144 and diode 146 to add an increment of charge to capacitor 166 which is continuously discharging through resistor 168. Gate 152 is enabled by a charge on capacitor 166 in excess of a predetermined level and remains continuously enabled if the pulses from flowmeter 16 arrive at intervals less than the time necessary for capacitor 166 to discharge below the predetermined level through resistor 168. Resistor 168 is made variable to facilitate adjustment of the rate of discharge of capacitor 166 and thus the length of time after the application of a flow responsive pulse to the diode pump circuit that gate 152 will remain enabled.

Figure 5:
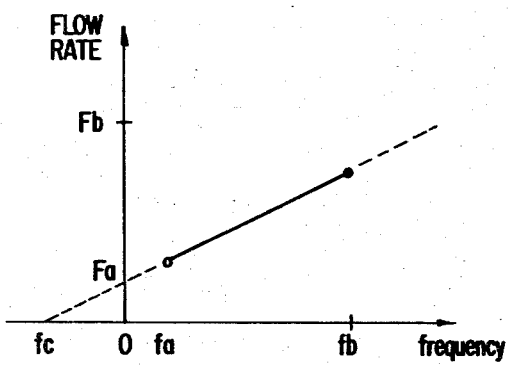
FIG. 5 is a graph illustrating the relationship of flow rate and flowmeter frequency due to bearing friction.

Referring to FIG. 5, flow rate F vs. the output frequency $f$ of flowmeter 16 is plotted over the operating range $f_a$ to $f_b$ of the flowmeter. From the graph, it is apparent that the frequency $f_c$ of the pulses necessary to correct for the effects of friction may be determined by the equation:

$$f_c = \frac{F_a(f_b - f_a) - f_a(F_b - F_u)}{F_b - F_a} \quad (4)$$

Hence, the frequency $f_c$ of oscillator 154, or, more specifically, the output signal from scaler 162, may be determined by the above equation so that additional flow pulses are added during operation of the flowmeter.

Figure 6:
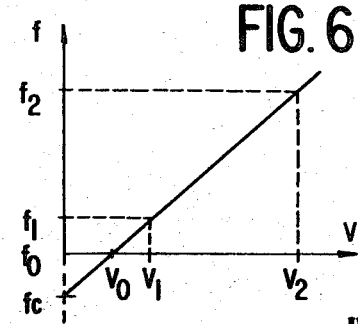
FIG. 6 is a graph illustrating the frequency response of flowmeter 16.

In a gas system compensated for abrupt variations of pressure and flow rate of the type described, the frequency response of the flowmeter 16 may vary as illustrated in the graph of FIG. 6, where the frequency $f$ of the flowmeter 16 is plotted along the Y axis and the volumetric flow rate V is plotted along the X axis. The frequency $f_c$ of oscillator 154 of FIG. 5 that is necessary to compensate for bearing friction of a gas flowmeter 16 is indicated on the graph of FIG. 6 and may be calculated as follows:

$$f_c = \frac{V_1(f_2 - f_1) - f_1(V_2 - V_1)}{V_2 - V_1} \quad (5)$$

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for compensating a fluid flowmeter for bearing friction comprising the step of:
    (a) generating a first series of electrical pulses having a frequency related to fluid flow;
    (b) generating a second series of electrical pulses having a frequency related to the diminution of the number of pulses in the first series of electrical pulses due to friction; and
    (c) selectively summing the pulses in the second series of electrical pulses with the pulses in the first series of electrical pulses.

2. The method of claim 1 wherein the second series of electrical pulses is summed with the first series of electrical pulses during periods of time when the pulses in the first series of electrical pulses have a pulse repetition rate greater than a predetermined value.

3. A system for compensating a fluid flowmeter for bearing friction comprising:
    a flowmeter for generating a series of electrical pulses having a frequency related to fluid flow;
    indicating means for manifesting an indication of fluid flow by counting electrical pulses;
    a source of electrical pulses having a frequency related to friction losses in said flow pulse generating means; and
    circuit means for selectively applying said flowmeter pulses and said friction loss pulses to said indicating means.

4. The system as defined in claim 3 wherein said circuit means comprises a friction compensation gate circuit connected to the output of said friction loss pulse source, and means for enabling said friction compensation gate circuit only when flowmeter pulses are being generated.

5. The system of claim 4 wherein said means for enabling said friction compensation gate circuit comprises:
    a storage capacitor;
    a circuit for applying charging pulses to said capacitor in response to the generation of flow pulses and for discharging said capacitor during the interval between the application of charging pulses; and
    means for connecting the voltage across said capacitor for enabling said friction compensation gate.

References Cited

UNITED STATES PATENTS

| | | | |
|---|---|---|---|
| 3,084,544 | 4/1963 | Taylor | 73—231M(X) |
| 3,385,108 | 5/1968 | Rosso | 73—231M(X) |
| 3,425,274 | 2/1969 | Clement et al. | 73—229(X) |

CHARLES A. RUEHL, Primary Examiner

U.S. Cl. X.R.

73—231M